UNITED STATES PATENT OFFICE.

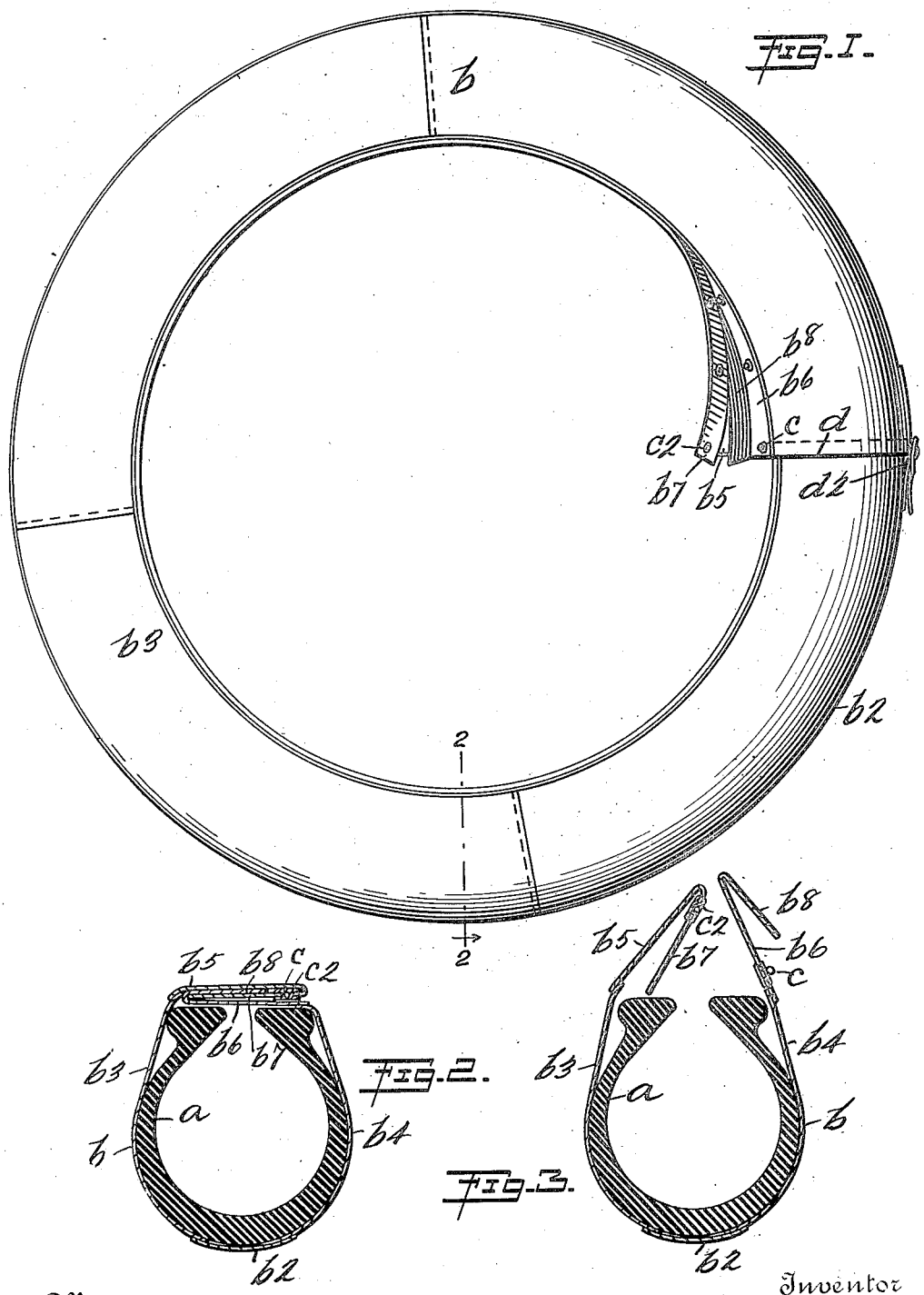

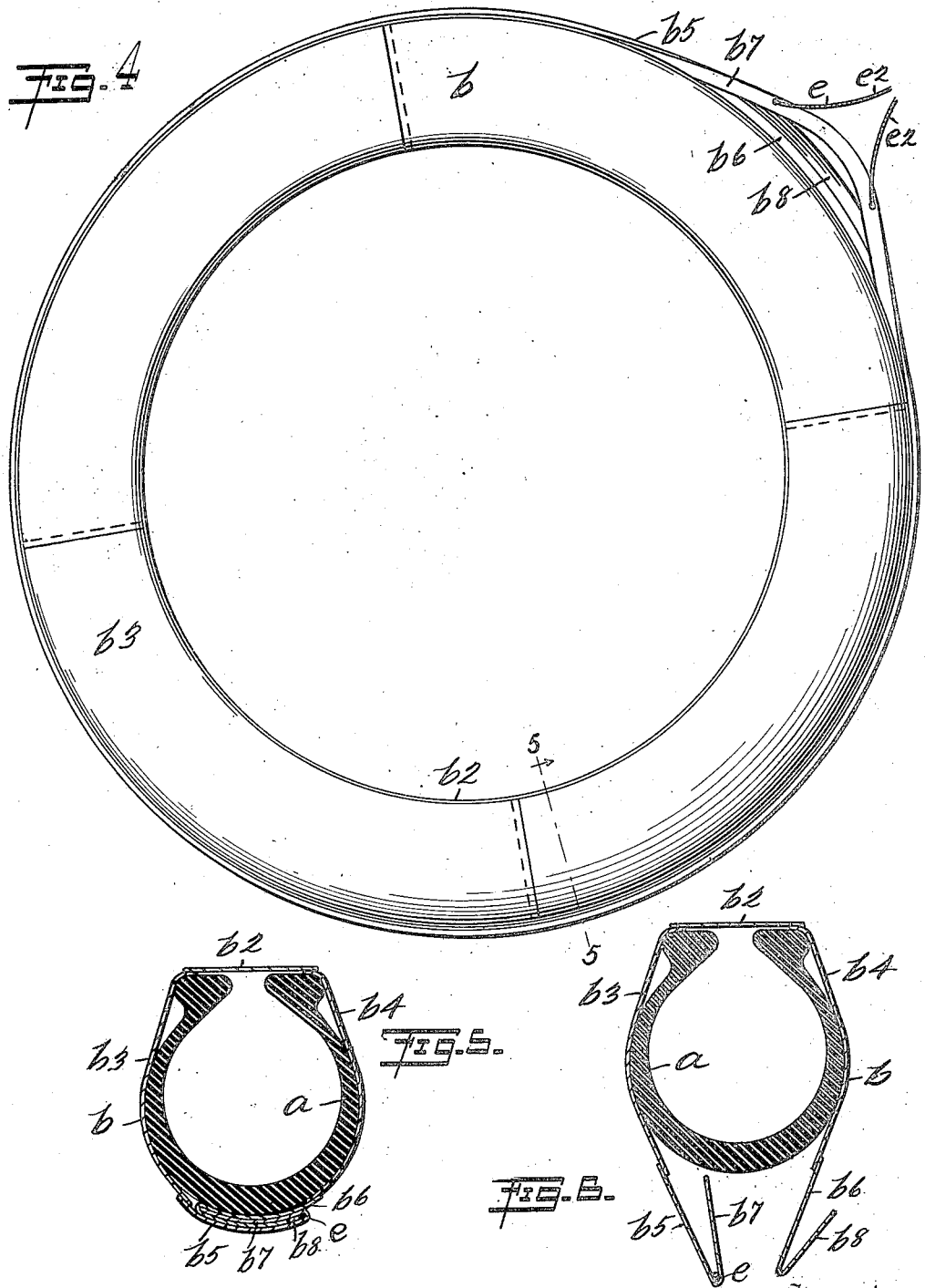

HYMAN COHEN, OF BROOKLYN, NEW YORK.

SPARE-TIRE COVER.

No. 922,669.      Specification of Letters Patent.      Patented May 25, 1909.

Application filed December 21, 1908. Serial No. 468,664.

*To all whom it may concern:*

Be it known that I, HYMAN COHEN, a subject of the Emperor of Russia, and residing at Brooklyn, in the county of Kings and State of New York, have invented certain new and useful Improvements in Spare-Tire Covers, of which the following is a specification, such as will enable those skilled in the art to which it appertains to make and use the same.

This invention relates to spare automobile tires, and the object thereof is to provide a covering for such tires which may be quickly and easily placed in position thereon.

A further object is to provide such a covering which is absolutely dust and water proof, such as rain, spattering and the like, and which is practically proof against the admission of water under pressure, as from a hose in the washing of an automobile carrying a spare tire provided with my invention.

A further object is to provide such a covering which is attractive in appearance because of a smooth exterior conforming closely to the inclosed tire.

A further object is to provide means for securing the said covering in position which are invisible and in a protected position; and still further objects are to produce such coverings which have no removable parts to be mislaid or lost, which may be rolled or folded into a compact form for storing when not in use, and which are comparatively inexpensive.

My invention is fully described in the following specification, of which the accompanying drawings form a part, in which the separate parts are designated by the same reference characters in each of the views, and in which:—

Figure 1 is an elevation of my invention in position, but partly opened for the purpose of description; Fig. 2 is a section taken on the line 2—2 of Fig. 1; Fig. 3 is a view similar to Fig. 2, but showing the covering open and ready for removing or closing; Fig. 4 is a view similar to Fig. 1, but showing a modification thereof; Fig. 5 is a section taken on the line 5—5 of Fig. 4; and Fig. 6 is a view similar to Fig. 5, but showing this form of covering in an open position.

In Figs. 1 to 3, inclusive, I have shown a tire, or rather shoe, $a$, around which my covering $b$ is to be placed for the protection thereof, said covering comprising a crown strip $b^2$, arranged around the periphery of the tire, and with which are connected side strips $b^3$ and $b^4$, by means of stitching or in any other desired manner, and with which are connected flaps $b^5$ and $b^6$, respectively, each of which is doubled to form supplemental flaps $b^7$ and $b^8$, respectively. Secured in the flap $b^6$, adjacent its connection with the side strip $b^4$, are a plurality of male members $c$ of the usual glove fasteners, the female members thereof, $c^2$, being secured in the supplemental flap $b^7$ in such manner as to register with the said male members and to be covered by the flap $b^5$ when the covering is closed, as shown in Fig. 2. The covering is made in annular form, preferably, to closely conform to the tire to be inclosed thereby, being open at one side, as shown at $d$ in Fig. 1, to form an overlap, and at this point I provide a buckle and straps $d^2$ or any other suitable fastener, although this is not absolutely necessary as the inner fasteners serve to hold the said overlap under normal conditions and the said straps may be made longer so that the overlap could be made greater and thus accommodate my covering to smaller tires and one or more of the inner fasteners be made inoperative according to the degree of such overlap.

In placing my covering in position, I first pass the same around the periphery of the tire in such manner as to bring the flaps $b^5$ and $b^6$ adjacent the inner diameter thereof, and at which time the fastener $d^2$ may be secured, after which the flap $b^6$ is folded inwardly so as to bear against the tire but with the supplemental flap $b^8$ in a partially raised position, the supplemental flap $b^7$ being then passed into the fold between the flap $b^6$ and supplemental flap $b^8$ and the flap $b^5$ carried toward the tire, thus forcing the said supplemental flap $b^7$ into the said fold, and when the male members $c$ are forced into the female members $c^2$, the said flaps and supplemental flaps form a tight closure against the admission of dust, dirt or other foreign matter, and against the admission of water, even though under pressure.

In the form of construction shown in Figs. 4 to 6, inclusive, the same construction is observed as in that just described, with the difference that the flaps $b^5$ and $b^6$ and supplemental flaps $b^7$ and $b^8$ are arranged upon the outer edge of the tire, this construction not requiring the overlapping ends shown at $d$ in Fig. 1, for the reason that the diameter of the cover opening is as great as the greatest diameter of the tire and which can thus be readily placed therein. In this form I may dispense with the fasteners shown for the said flaps, employing, instead, a cord $e$ passed through the edge of the flap $b^5$ at its junction with the supplemental flap $b^7$, and the ends thereof projecting, as shown at $e^2$ and which may be tied or otherwise secured to bind the flap $b^5$ firmly upon the flap $b^6$, thus producing a neat and continuously tight closure therebetween which is dust and waterproof.

If desired, I may direct the flaps in opposite directions in the upper and lower halves of the cover and I may also employ flap fasteners which permit of a certain degree of adjustment, to accommodate the cover to tires of varying shapes and of different thicknesses, such as straps and buckles, lacing and the like, the specific fasteners not being material, as many forms thereof will suggest themselves, and various other changes in and modifications of the forms of construction herein shown and described may be made, without departing from the spirit thereof, viz:—interlocked flaps, or sacrificing its advantages and, reserving the right to all such changes.

What I claim as new, and desire to secure by Letters Patent, is:—

1. A covering for tires, comprising an annular, cylindrical body member and interlocking flaps at one point thereof.

2. A covering for tires, comprising an annular, cylindrical body member, flaps at one point thereof and supplemental flaps connected with said first named flaps, said flaps and supplemental flaps being interlocked to close said covering.

3. A covering for tires, comprising an annular, cylindrical body member, interlocking flaps at one point thereof and fasteners for said flaps.

4. A covering for tires, comprising an annular, cylindrical body member, interlocking flaps at one point thereof and fasteners for said flaps covered by the outer one thereof.

5. A covering for tires, comprising an annular, cylindrical body member, flaps at one point thereof, supplemental flaps connected with said first named flaps and adapted to interlock to close said cover, and fasteners for said flaps, one member thereof being on one of said flaps and the other member being on one of said supplemental flaps and covered by the other of said first named flaps.

6. A covering for tires, comprising an annular, cylindrical body member open at one point, and a V-shaped flap at each side of said opening, said flaps being interlocked to close said opening.

7. A covering for tires, comprising an annular, cylindrical body member having joined ends, a fastener for said ends, and interlocking flaps throughout the length thereof.

8. A covering for tires, comprising an annular, cylindrical body member having joined ends, interlocking flaps throughout the length thereof, and means for fastening said flaps together.

In testimony that I claim the foregoing as my invention I have signed my name in presence of the subscribing witnesses, this 19th day of December 1908.

HYMAN COHEN.

Witnesses:
J. M. BAUM,
J. C. LARSEN.